(12) United States Patent
Johnson et al.

(10) Patent No.: US 10,161,371 B2
(45) Date of Patent: Dec. 25, 2018

(54) OPPOSED PISTON THREE NOZZLE PISTON BOWL DESIGN

(71) Applicant: AVL Powertrain Engineering, Inc., Plymouth, MI (US)

(72) Inventors: Gustav R. Johnson, Canton, MI (US); Gary L. Hunter, Brighton, MI (US); Darrell Sparks, Garden City, MI (US)

(73) Assignee: AVL POWERTRAIN ENGINEERING, INC., Plymouth, MI (US)

( * ) Notice: Subject to any disclaimer, the term of this patent is extended or adjusted under 35 U.S.C. 154(b) by 248 days.

(21) Appl. No.: 15/050,945

(22) Filed: Feb. 23, 2016

(65) Prior Publication Data

US 2016/0252067 A1 Sep. 1, 2016

Related U.S. Application Data

(60) Provisional application No. 62/121,879, filed on Feb. 27, 2015, provisional application No. 62/121,815, (Continued)

(51) Int. Cl.
*F02B 75/28* (2006.01)
*F02M 61/14* (2006.01)
(Continued)

(52) U.S. Cl.
CPC ............... *F02M 61/14* (2013.01); *F01B 7/02* (2013.01); *F02B 23/069* (2013.01);
(Continued)

(58) Field of Classification Search
CPC .... F02M 61/14; F01B 7/02; F02F 3/24; F02B 75/28; F02B 25/08; F02B 23/069;
(Continued)

(56) References Cited

U.S. PATENT DOCUMENTS 1,127,772 A 2/1915 Junkers
1,143,408 A 6/1915 Kramer
(Continued)

FOREIGN PATENT DOCUMENTS

CN 102588075 A 7/2012
DE 102007056913 A1 5/2009
(Continued)

OTHER PUBLICATIONS

CRIN2 HD—Component Description. [Retrieved on Jan. 28, 2015] Retrieved from the Internet. <URL: http://www.nantai-china.com/english/contentfile/20111222114949339.jpg>.
(Continued)

*Primary Examiner* — Marguerite McMahon
(74) *Attorney, Agent, or Firm* — Harness, Dickey & Pierce, P.L.C.

(57) ABSTRACT

A piston may include an outer peripheral surface and a crown. The outer peripheral surface may include first and second openings spaced about and extending through the outer peripheral surface. The crown may include a recess at least partially defined by a first lobe in fluid communication with the first opening and a second lobe in fluid communication with the second opening. Each of the first and second lobes may be recessed relative to an adjacent portion of the recess of the crown.

17 Claims, 6 Drawing Sheets

Related U.S. Application Data filed on Feb. 27, 2015, provisional application No. 62/121,788, filed on Feb. 27, 2015, provisional application No. 62/126,009, filed on Feb. 27, 2015.

(51) Int. Cl.
- *F02B 23/06* (2006.01)
- *F02B 25/08* (2006.01)
- *F02F 3/24* (2006.01)
- *F01B 7/02* (2006.01)

(52) U.S. Cl.
CPC ...... *F02B 23/0627* (2013.01); *F02B 23/0663* (2013.01); *F02B 23/0678* (2013.01); *F02B 23/0687* (2013.01); *F02B 25/08* (2013.01); *F02B 75/28* (2013.01); *F02B 75/282* (2013.01); *F02F 3/24* (2013.01); *F02B 23/066* (2013.01); *Y02T 10/125* (2013.01)

(58) Field of Classification Search
CPC .............. F02B 23/0687; F02B 23/0678; F02B 23/0663; F02B 75/282; F02B 23/0627; F02B 23/066; Y02T 10/125
USPC ................. 123/51 R–51 BD, 52.1–53.8, 18 R
See application file for complete search history.

(56) References Cited

U.S. PATENT DOCUMENTS

| | | | |
|---|---|---|---|
| 1,486,583 A | | 3/1924 | Huskisson |
| 2,463,418 A | | 3/1949 | Pescara |
| 3,007,462 A | | 11/1961 | Balzer |
| 3,407,790 A | † | 10/1968 | Antonsen |
| 3,777,977 A | | 12/1973 | Regneault et al. |
| 3,997,117 A | | 12/1976 | Kohler et al. |
| 4,043,301 A | † | 8/1977 | Rheingold |
| 4,872,433 A | | 10/1989 | Paul et al. |
| 5,042,441 A | | 8/1991 | Paul et al. |
| 6,170,443 B1 | † | 1/2001 | Hofbauer |
| 7,334,570 B2 | | 2/2008 | Klyza |
| 8,677,950 B2 | | 3/2014 | Hofbauer |
| 8,689,768 B2 | | 4/2014 | Saruwatari |
| 8,783,218 B2 | * | 7/2014 | Shen ................. F02B 23/0675 123/51 R |
| 8,800,528 B2 | | 8/2014 | Fuqua et al. |
| 8,820,294 B2 | | 9/2014 | Fuqua et al. |
| 8,997,710 B2 | | 4/2015 | Herold et al. |
| 9,211,797 B2 | | 12/2015 | Abani et al. |
| 2002/0109014 A1 | | 8/2002 | Augustin |
| 2003/0101967 A1 | | 6/2003 | Forck et al. |
| 2004/0139932 A1 | | 7/2004 | Palmer |
| 2006/0157003 A1 | | 7/2006 | Lemke et al. |
| 2010/0071671 A1 | * | 3/2010 | Lemke ................. F01B 7/14 123/51 R |
| 2010/0252010 A1 | † | 10/2010 | Phillips |
| 2012/0080007 A1 | | 4/2012 | Herold et al. |
| 2012/0192831 A1 | * | 8/2012 | Tusinean ............ F02B 23/0663 123/299 |
| 2012/0285418 A1 | | 11/2012 | Elsbett et al. |
| 2013/0014718 A1 | | 1/2013 | Shen et al. |
| 2013/0025556 A1 | * | 1/2013 | Hofbauer ................. F01B 7/08 123/18 R |
| 2013/0036999 A1 | | 2/2013 | Levy et al. |
| 2013/0104848 A1 | | 5/2013 | Klyza et al. |
| 2013/0146021 A1 | | 6/2013 | Hofbauer et al. |
| 2013/0152547 A1 | | 6/2013 | Hofbauer |
| 2013/0213342 A1 | | 8/2013 | Burton et al. |
| 2013/0276762 A1 | † | 10/2013 | Hofbauer |
| 2014/0014063 A1 | | 1/2014 | Redon |
| 2014/0026840 A1 | † | 1/2014 | Okada |
| 2015/0013649 A1 | | 1/2015 | Fuqua et al. |
| 2015/0285127 A1 | | 10/2015 | Abani et al. |
| 2015/0377169 A1 | | 12/2015 | Takeda |
| 2016/0032823 A1 | * | 2/2016 | McClearen ............. F02B 75/28 123/51 B |
| 2016/0032859 A1 | | 2/2016 | Klingbeil et al. |
| 2016/0195028 A1 | | 7/2016 | Redon et al. |
| 2016/0252067 A1 | | 9/2016 | Johnson et al. |

FOREIGN PATENT DOCUMENTS

| | | | |
|---|---|---|---|
| EP | 0196265 A2 | | 10/1986 |
| EP | 0836003 A1 | | 4/1998 |
| EP | 2672101 A1 | | 12/2013 |
| EP | 2837802 A1 | | 2/2015 |
| FR | 2145081 A5 | | 2/1973 |
| GB | 1014831 | † | 12/1965 |
| GB | 2019487 A | | 10/1979 |
| GB | 2491155 A | | 11/2012 |
| GB | 2493260 A | | 1/2013 |
| GB | 2530761 A | | 4/2016 |
| GB | 2515254 B | | 7/2016 |
| JP | 2009-103085 A | | 5/2009 |
| JP | 4576884 B2 | | 11/2010 |
| WO | WO-2001025618 A1 | | 4/2001 |
| WO | 2011061191 A1 | | 5/2011 |
| WO | 2012143075 A1 | † | 10/2012 |
| WO | 2012158756 A1 | | 11/2012 |
| WO | WO-2014000946 A1 | | 1/2014 |
| WO | 2014030319 A1 | † | 2/2014 |
| WO | 2014096956 A1 | † | 6/2014 |
| WO | 2014162143 A1 | | 10/2014 |

OTHER PUBLICATIONS

Extended European Search Report for Application No. 16157549.3 dated May 23, 2016.
Parche, Dr. Marcus. Diesel Engine-Efficieny and Emissions Research Conference Aug. 20-24, 2006. [Retrieved on May 25, 2016] Retrieved from the Internet. <URL: http://energy.gov/sites/prod/files/2014/03/f9/226_deer_parche.pdf.> p. 15.
Advanced Opposed-piston Two-stroke Diesel Demonstrator.
Opposed Piston Engines: Evolution, Use and Future Applications.
Extended European Search Report for Application No. 16157545.1 dated Jul. 21, 2016.
Extended European Search Report for Application No. 16157539.4 dated Jul. 19, 2016.

\* cited by examiner
† cited by third party

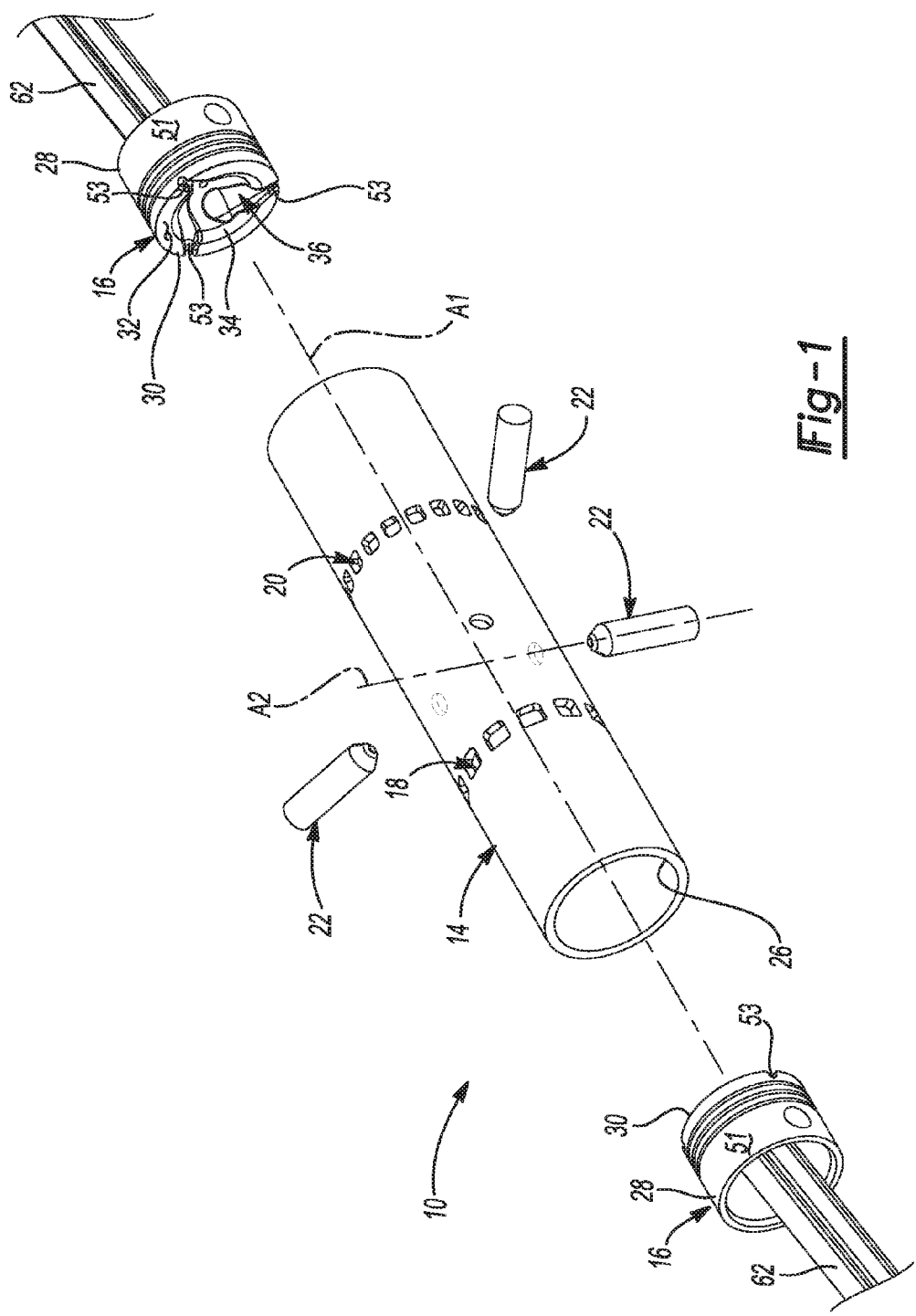

OPPOSED PISTON THREE NOZZLE PISTON BOWL DESIGN

CROSS-REFERENCE TO RELATED APPLICATIONS

This application claims the benefit of U.S. Provisional Application No. 62/121,879, filed on Feb. 27, 2015, U.S. Provisional Application No. 62/121,788, filed on Feb. 27, 2015, U.S. Provisional Application No. 62/121,815, filed on Feb. 27, 2015, and U.S. Provisional Application No. 62/126,009, filed on Feb. 27, 2015. Furthermore, this application is related to U.S. patent application Ser. No. 15/050,792, filed Feb. 23, 2016, and U.S. patent application Ser. No. 15/050,883, filed Feb. 23, 2016, and U.S. patent application Ser. No. 15/050,878, filed Feb. 23, 2016. The entire disclosures of the applications referenced above are incorporated herein by reference.

FIELD

The present disclosure relates to opposed piston engines, and more particularly to opposed piston engines having a combustion chamber that is at least partially defined by opposed pistons having a three-sided or three-lobed bowl.

BACKGROUND

This section provides background information related to the present disclosure and is not necessarily prior art.

Opposed piston engines include two pistons housed within a single cylinder that move in an opposed, reciprocal manner within the cylinder. In this regard, during one stage of operation, the two pistons are moving away from one another within the cylinder. During another stage of operation, the two pistons are moving towards one another within the cylinder.

Nozzles or injection ports can be used to inject a fuel into the cylinder and between the pistons. As the pistons move towards one another within the cylinder, the crown or bowl portion of the pistons can compress and, thus, cause the ignition of the fuel. In some configurations, each cylinder can include more than one fuel nozzle. In such configurations, the shape of the crown or bowl of the piston can affect the characteristics and performance of the combustion process.

While known opposed-piston engines have generally proven to be acceptable for their intended purposes, a continued need in the relevant art remains for a piston, and an opposed piston engine, having improved combustion performance, including efficient air utilization and fuel mixing.

SUMMARY

This section provides a general summary of the disclosure, and is not a comprehensive disclosure of its full scope or all of its features.

The present disclosure provides a piston. The piston may include an outer peripheral surface and a crown. The outer peripheral surface may include first and second openings spaced about and extending through the outer peripheral surface. The crown may include a recess at least partially defined by a first lobe in fluid communication with the first opening and a second lobe in fluid communication with the second opening. Each of the first and second lobes may be recessed relative to an adjacent portion of the recess of the crown.

In some configurations, the first lobe include a first radially outer concave surface and the second lobe may include a second radially outer concave surface.

In some configurations, the outer peripheral surface includes a third opening extending through the outer peripheral surface. The first, second, and third openings may be equally spaced about the outer peripheral surface.

In some configurations, the crown is at least partially defined by a third lobe in fluid communication with the third opening. The third lobe may be recessed relative to the adjacent portion of the recess of the crown.

In some configurations, the first opening is angularly offset relative to the second opening by a first angle, the second opening is angularly offset relative to the third opening by a second angle, and the third opening is angularly offset relative to the first opening by a third angle. The first and third angles may be equal to one another and greater than the second angle.

In some configurations, the recess may be at least partially defined by a central mixing surface extending from and between the first, second, and third lobes.

In some configurations, the central mixing surface may include a central portion and first, second, and third branches extending radially outward from the central portion.

In some configurations, the first, second, and third lobes may be recessed relative to the central mixing surface.

In some configurations, the first lobe may include a first centerline, the second lobe may include a second centerline, and the third lobe may include a third centerline.

In some configurations, the first centerline may intersect the first opening and the second centerline.

In some configurations, the second centerline may intersect the second opening and the third centerline.

In some configurations, the third centerline may intersect the third opening and the first centerline.

The present disclosure also provides an opposed piston engine. The opposed piston engine may include the piston, a first housing, and a second piston. The first housing may define a first passage extending along a first longitudinal axis. The piston may be slidably disposed within the first passage. The second piston may be slidably disposed within the first passage. The second piston may include a second outer peripheral surface and a second crown. The second outer peripheral surface may include third and fourth openings equally spaced about and extending through the second outer peripheral surface. The second crown may include a second recess at least partially defined by a third lobe in fluid communication with the third opening and a fourth lobe in fluid communication with the fourth opening.

In some configurations, the first lobe may be aligned with the third lobe to define a first volume, and the second lobe may be aligned with the fourth lobe to define a second volume. The first volume may be distinct from the second volume.

In some configurations, the opposed piston engine may include a first fuel injector in fluid communication with the first volume and a second fuel injector in fluid communication with the second volume.

In some configurations, the first and second recesses may at least partially define a combustion chamber.

In some configurations, the opposed piston engine may include a second housing and a third piston. The second housing may define a second passage extending along a second longitudinal axis substantially parallel to the first longitudinal axis. The third piston may be slidably disposed within the second passage. The third piston may include a third outer peripheral surface and a third crown. The third outer peripheral surface may include fifth and sixth openings equally spaced about the third outer peripheral surface. The third crown may include a third recess at least partially defined by a fifth lobe in fluid communication with the fifth opening and a sixth lobe in fluid communication with the sixth opening.

In some configurations, the fifth opening may be offset by a first angle about the second longitudinal axis relative to the orientation of the first opening about the first longitudinal axis.

In some configurations, the sixth opening may be offset by a second angle about the second longitudinal axis relative to the orientation of the second opening about the first longitudinal axis.

In some configurations, the first angle may be substantially equal to the second angle.

In some configurations, the first angle may be between 45 degrees and 75 degrees.

In some configurations, the first angle may be substantially equal to 60 degrees.

The present disclosure also provides another opposed piston engine. The opposed piston engine may include a housing and a piston. The housing may define a first passage extending along a first longitudinal axis. The piston may be slidably disposed within the housing. The piston may include an outer peripheral surface, a crown, and first, second, and third nozzles. The outer peripheral surface may include first, second, and third openings equally spaced about and extending through the outer peripheral surface. The crown may include a recess at least partially defined by a first lobe, a second lobe, and a third lobe. The first lobe may be in fluid communication with the first opening and may include a first centerline. The second lobe may be in fluid communication with the second opening and may include a second centerline. The third lobe may be in fluid communication with the third opening and may include a third centerline. The first, second, and third nozzles may be in fluid communication with the first, second, and third openings, respectively. The first nozzle may have a first longitudinal axis, the second nozzle may have a second longitudinal axis, and the third nozzle may have a third longitudinal axis.

In some configurations, the first longitudinal axis of the first nozzle is angularly offset relative to the first centerline of the first lobe, the second longitudinal axis of the second nozzle is angularly offset relative to the second centerline of the second lobe, and the third longitudinal axis of the third nozzle is angularly offset relative to the second centerline of the second lobe.

In some configurations, the first longitudinal axis of the first nozzle is aligned with the first centerline of the first lobe, the second longitudinal axis of the second nozzle is aligned with the second centerline of the second lobe, and the third longitudinal axis of the third nozzle is aligned with the third centerline of the third lobe.

In some configurations, the first, second, and third lobes are recessed relative to adjacent portions of the recess of the crown.

In some configurations, the first centerline intersects the first opening and the second centerline, the second centerline intersects the second opening and the third centerline, and the third centerline intersects the third opening and the first centerline.

In some configurations, the recess is at least partially defined by a central mixing surface extending from and between the first, second, and third lobes. The central mixing surface may include a central portion and first, second, and third branches extending radially outward from the central portion. The first, second, and third lobes may be recessed relative to the central mixing surface.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is an exploded view of an opposed piston engine in accordance with the principles of the present disclosure;

Corresponding reference numerals indicate corresponding parts throughout the several views of the drawings.

DETAILED DESCRIPTION

Figure 2A:
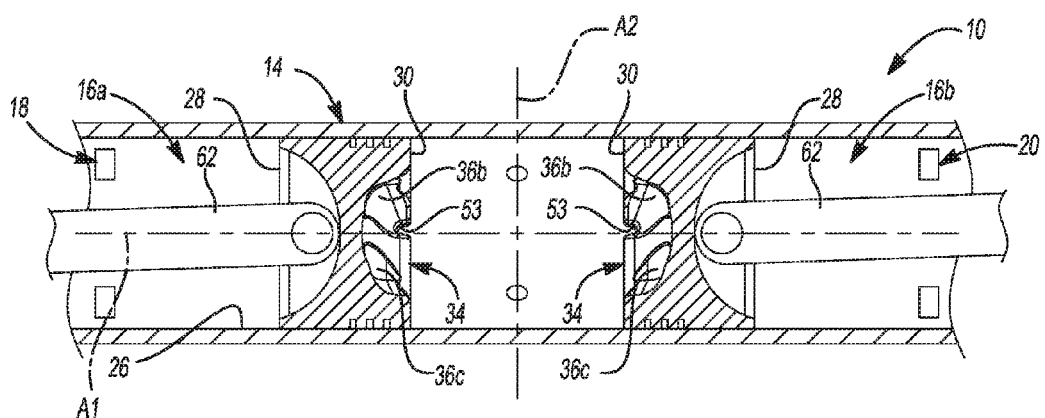
FIG. 2A is a cross-sectional view of the opposed-piston engine of FIG. 1 taken along a longitudinal axis of the engine.

Example embodiments will now be described more fully with reference to the accompanying drawings.

With reference to FIGS. 1-3B, an engine 10 is provided. In one configuration, the engine 10 may be an opposed-piston, two-stroke diesel engine for use in a vehicle or other machine. It will be appreciated, however, that the engine 10 may have other configurations such as a spark-ignition engine within the scope of the present disclosure.

The engine 10 may include a housing or cylinder 14, one or more pistons 16, outlet ports 18, inlet ports 20, and at least one fuel injector or nozzle 22. With reference to FIG. 3B, while four cylinders 14 are shown, it will be appreciated that the engine 10 may include any number of cylinders 14, each including at least one piston 16, as is known in the art. As illustrated in FIG. 1, in one configuration, each cylinder 14 of the engine 10 may include two pistons 16.

The cylinder 14 may be formed from a material such as iron, steel, or a suitable metallic alloy, and may extend along a longitudinal axis A1. In this regard, the longitudinal axis A1 may be a central longitudinal axis A1, such that the cylinder 14 is symmetrically disposed about the longitudinal axis A1. The cylinder 14 may also include a transverse axis A2 extending in a direction substantially perpendicular to the longitudinal axis A1. A bore or passage 26 may extend through, or otherwise be defined by, the cylinder 14 along the longitudinal axis A1. The outlet ports 18 and the inlet ports 20 may be configured to fluidly communicate with the passage 26. In this regard, the inlet ports 20 can be configured to deliver air (e.g., ambient air, air from a turbocharger or other portion of an exhaust gas regeneration system (not shown), etc.) to the passage 26 for combustion, while the outlet ports 18 can be configured to remove exhaust gases from the passage 26 after combustion.

The pistons 16 may be slidably disposed in the passage 26 of the cylinder 14 for opposed, reciprocating motion along the longitudinal axis A1. Each piston 16 may include a skirt 28 and a bowl or crown 30. In some configurations, the skirt 28 can be integrally or monolithically formed with the crown 30. The crown 30 may include an end surface 32 having, or otherwise defining, a recess 34. The recess 34 may include one or more portions or lobes 36. While the recess 34 is illustrated to include first, second, and third lobes 36a, 36b, 36c, the recess 34 may also include greater than or less than three lobes 36. In this regard, it will be appreciated that the number of lobes 36 may correspond to, or otherwise equal, the number of nozzles 22.

The first lobe 36a may be substantially similar to the second and third lobes 36b, 36c, apart from any exceptions described below and/or shown in the figures. Accordingly, except as otherwise provided, references herein to the lobe 36 will be understood to apply equally to the first, second, and third lobes 36a, 36b, 36c, and like reference numerals may be used to describe similar features of the first, second, and third lobes 36a, 36b, 36c.

Figure 3A:
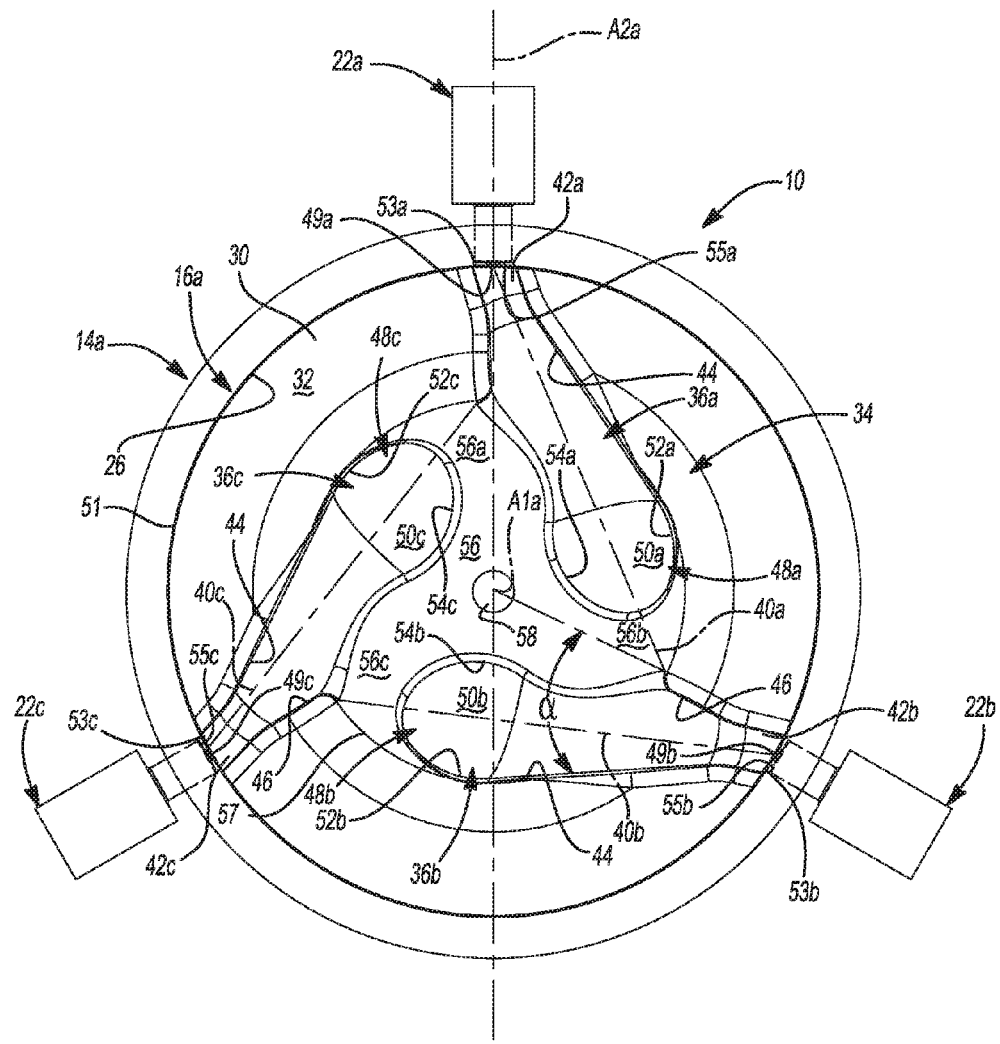
FIG. 3A is a cross-sectional view of the opposed-piston engine of FIG. 1 taken in a plane that includes a transverse axis of the engine.
Figure 3B:
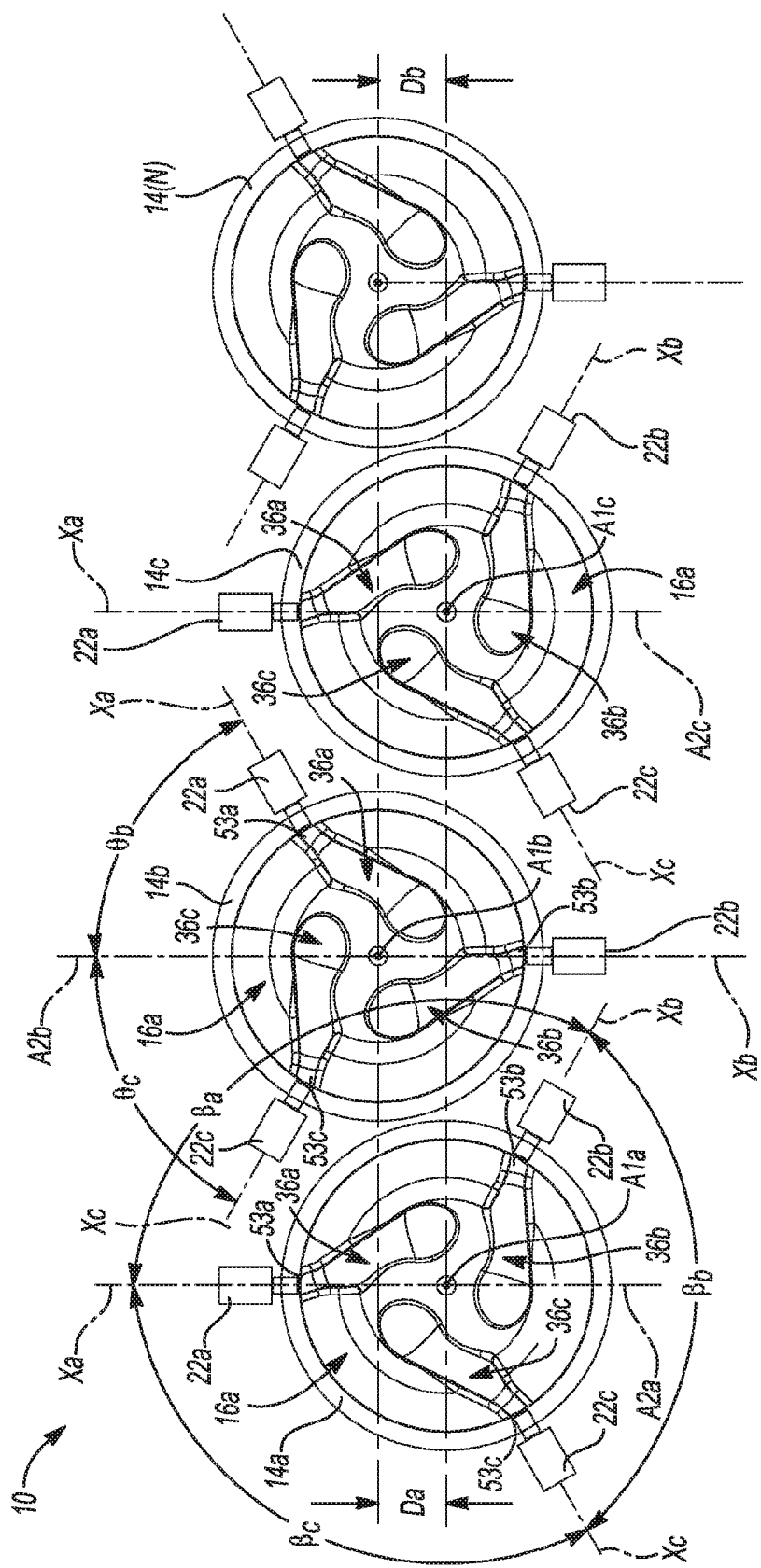
FIG. 3B is a cross-sectional view of the opposed-piston engine of FIG. 1 taken in a plane that includes a transverse axis of the engine, the opposed-piston engine including more than one cylinder.

With reference to FIG. 3A, the lobe 36 may extend along a lobe center line 40 and include a tip or nose 42, first and second flank surfaces 44, 46 and a base or heel 48. The lobe 36, including the nose 42, the first and second flank surfaces 44, 46, and the heel 48, can be collectively defined by a lobe surface 50 having a concave shape or profile. The nose 42 may be configured to fluidly communicate with the nozzle 22. In this regard, an outer peripheral surface 51 of the piston 16 may include an aperture or opening 53 in fluid communication with the lobe 36. As will be explained in more detail below, when the piston 16 is approaching a top dead center position within the cylinder 14, the nozzle 22 may inject fuel into the nose 42 of the lobe 36 through the opening 53. The lobe center line 40 may intersect, or otherwise extend from, the nozzle 22, such that fuel injected from the nozzle 22 and into the nose 42 generally travels along the lobe center line 40. In various implementations, the lobe center line 40 may extend through a central point 49 on a distal end 55 of the nozzle. The nozzle 22 may inject fuel into the cylinder 14 from the central point 49 and generally along the center line 40. The first and second flank surfaces 44, 46 may extend from the end surface 32 of the crown 30, and from and between the nose 42 and the heel 46. In this regard, as illustrated in FIG. 3A, the first and second flank surfaces 44, 46 may oppose, or otherwise face, one another, and define an angle α therebetween. In some configurations, the first and second flank surfaces 44, 46 may be generally parallel, such that the angle α is substantially equal to zero. In other configurations, the angle α may be greater than zero degrees and less than 40 degrees.

The heel 48 of the lobe 36 may include a radially outer surface or side 52 and a radially inner surface or side 54. The radially outer surface 52 may extend from the end surface 32 and define a generally concave shape. In some configurations, the lobe center line 40a of the first lobe 36a may intersect the lobe center line 40b of the second lobe 36b, the lobe center line 40b of the second lobe 36b may intersect the lobe center line 40c of the third lobe 36c, and the lobe center line 40c of the third lobe 36c may intersect the lobe center line 40a of the first lobe 36a, such that a portion of the radially outer surfaces 52a, 52b, 52c of the first, second and third lobes 36a, 36b, 36c collectively define a substantially circular profile or shape 57. In this regard, the radially outer surfaces 52a, 52b, 52c may collectively define the circular profile or shape 57 having flank surfaces 44, 46 projecting radially outward therefrom. In other configurations, the lobe center lines 40a, 40b, 40c may intersect one another such that the radially outer surfaces 52a, 52b, 52c of the first, second and third lobes 36a, 36b, 36c may collectively define other shapes, including a trefoil or other multi-lobed shape.

The radially inner side 54 may extend from the end surface 32 and define a generally concave shape. As illustrated, the radially inner side 54a of the first lobe 36a may open into, or otherwise communicate with, the radially inner sides 54b, 54c of the second and third lobes 36b, 36c. Similarly, the radially inner side 54b of the second lobe 36b may open into, or otherwise communicate with, the radially inner sides 54a, 54c of the first and third lobes 36a, 36c, and the radially inner side 54c of the third lobe 36c may open into, or otherwise communicate with, the radially inner sides 54a, 54b of the first and second lobes 36a, 36b. In this regard, it will be appreciated that the radially inner sides 54a, 54b, 54c may each communicate at, and with, a central portion of the recess 34, which may be referred to as a mixing surface 56.

With reference to FIG. 3A, the mixing surface 56 may extend from and between the end surface 32 of the crown 30 and the lobe surface 50 of the first, second and third lobes 36a, 36b, 36c. As illustrated, the mixing surface 56 may include first, second, and third branches 56a, 56b, 56c extending radially outward from a central portion 58 of the mixing surface 56. The lobe surfaces 50a, 50b, 50c and the mixing surface 56 may collectively define the recess 34. As illustrated in FIGS. 1 and 3A, the recess 34 may define a portion of a sphere. In this regard, as described above, the lobe center lines 40a, 40b, 40c may intersect one another such that in some configurations the recess 34 may define a substantially hemispherical shape that may be symmetrically disposed about the longitudinal axis A1. As will be explained in more detail below, the lobe surface 50 and the mixing surface 56 can help to ensure proper mixing of the fuel when it is injected by the nozzles 22.

Figure 2B:
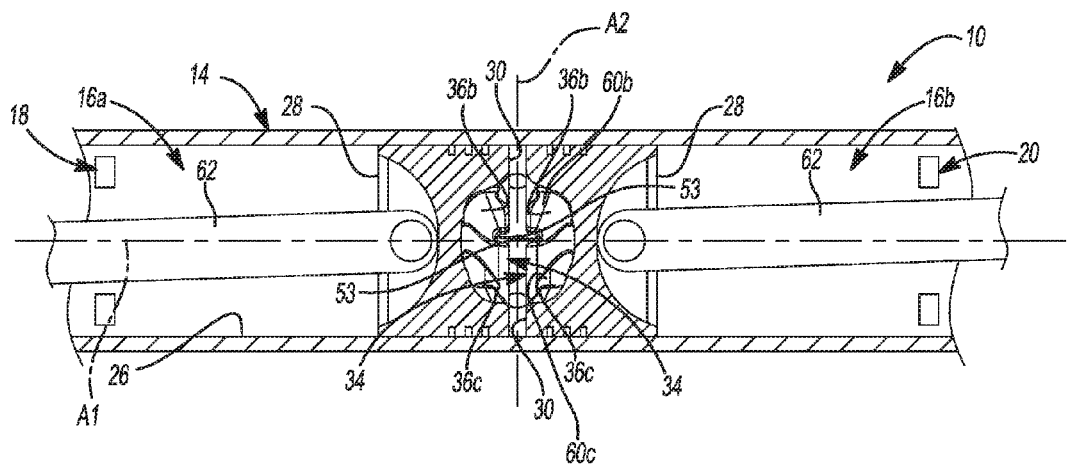
FIG. 2B is a cross-sectional view of the opposed-piston engine of FIG. 1 taken along a longitudinal axis of the engine, and showing a pair of pistons in a top dead center position.

As illustrated in FIG. 2A, in an assembled configuration, the recess 34 of a first piston 16a may face the recess 34 of a second piston 16b. In this regard, the first and second pistons 16a, 16b may be disposed within the passage 26 such that the first, second, and third lobes 36a, 36b, 36c of the first piston 16a are aligned with the first, second, and third lobes 36a, 36b, 36c, respectively, of the second piston 16b. Accordingly, as illustrated in FIG. 2B, at a top dead center position, the recess 34 of the first piston 16a may cooperate with the recess 34 of the second piston 16b to at least partially define a combustion chamber therebetween. In some configurations, the first lobe 36a of the first piston 16a and the first lobe 36a of the second piston 16b may define a first volume 60a, the second lobe 36a of the first piston 16a and the second lobe 36a of the second piston 16b may define a second volume 60b, and the third lobe 36a of the first piston 16a and the third lobe 36a of the second piston 16b may define a third volume 60b. Each of the first, second, and third volumes 60a, 60b, 60c may be distinct from the other(s) of the first, second, and third volumes. The first, second, and third volumes 60a, 60b, 60c may be symmetrically disposed relative to the longitudinal axis A1. Specifically, the first, second, and third volumes 60a, 60b, 60c may be symmetrically disposed relative to a cross section of the engine 10 intersecting the longitudinal axis A2, and symmetrically disposed relative to a cross section of the engine 10 intersecting the transverse axis A1. In other configurations, the first, second, and third lobes 36a, 36b, 36c of the first piston 16a may be offset from, and/or have a different shape or profile than the first, second, and third lobes 36a, 36b, 36c of the second piston 16b, such that the lobes 36a, 36b, 36c and/or the volumes 60a, 60b, 60c are asymmetrically disposed relative to the cross section of the engine 10 intersecting the longitudinal axis Al, and/or asymmetrically disposed relative to the cross section of the engine 10 intersecting the transverse axis A2.

As illustrated in FIG. 3B, the first piston 16a of a first cylinder 14a may be angularly offset relative to the orientation of the first piston 16a of a second cylinder 14b. Similarly, the first piston 16a of a third cylinder 14c may be angularly offset relative to the orientation of the first piston 16a of the second cylinder 14b. In this regard, as explained in more detail below, the first piston 16a of the second cylinder 14b may be rotated by a first angle θb about the longitudinal axis A1b of the second cylinder 14b relative to the orientation of the first piston 16a of the first cylinder 14a about the longitudinal axis A1a of the first cylinder 14a. Similarly, the first piston 16a of the third cylinder 14c may be rotated by a second angle (not shown) about the longitudinal axis A1c of the third cylinder 14c relative to the orientation of the first piston 16a of the second cylinder 14b about the longitudinal axis A1b of the second cylinder 14b. In some configurations, the first angle θb may be substantially equal to the second angle, such that the first piston 16a of the first cylinder 14a is substantially angularly aligned with the first piston 16a of the third cylinder 14c relative to, or about, the longitudinal axes A1a and A1c. It will be appreciated that the second pistons 16b of the first, second, and third cylinders 14a, 14b, 14c may also be angularly offset from one another as described above with respect to the first pistons 16a.

As the first and second pistons 16a, 16b slide or otherwise move within the passage 26 between a bottom dead center position (not shown) and a top dead center position (FIG. 2B), the size of the volumes 60a, 60b, 60c will vary between a fully compressed configuration (FIG. 2B) and a fully expanded configuration (FIG. 2A). In this regard, each piston 16 may be supported by, or otherwise coupled to, a connecting rod 62. The connecting rod 62 can be supported by, or otherwise coupled to, a crankshaft (not shown). As the pistons 16 slide or otherwise translate within the passage 26 of the cylinder 14, the translational movement of the pistons 16 can be converted to the rotational movement of the crankshaft through the connecting rod 62.

The nozzle 22 can be disposed within, or otherwise extend through, the cylinder 14. As illustrated in FIG. 3B, in some configurations each nozzle 22 is offset from an adjacent nozzle 22 by an angle β about the longitudinal axis A1. Specifically, the first nozzle 22a may extend from the cylinder 14 along an axis Xa, the second nozzle 22b may extend from the cylinder along an axis Xb, and the third nozzle 22c may extend from the cylinder along an axis Xc. The axis Xa may be offset from the axis Xb by an angle βa, the axis Xb may be offset from the axis Xc by an angle βb, and the axis Xc may be offset from the axis Xa by an angle βc. In some configurations, the angle βa may be substantially equal to the angle βb, and the angle βb may be substantially equal to the angle βc, such that the nozzles 22a, 22b and 22c are symmetrically disposed about the longitudinal axis A1. In one example, βa, βb, and βc may each be equal to an angle between 100 degrees and 140 degrees. In one particular example, βa, βb, and βc may each be equal to 120 degrees. It will also be appreciated that the angle βa may differ from the angle βb, and/or the angle βb may differ from the angle βc.

The nozzles 22 may be in fluid communication with the passage 26. In this regard, the nozzles 22 can be configured to spray or otherwise deliver a volume of fuel to the volumes 60a, 60b, 60c for combustion. In some configurations the nozzles 22a, 22b, 22c may deliver the volume of fuel in a direction substantially along or parallel to the axes Xa, Xb, Xc, respectively. In other configurations, the volume of fuel may be delivered in a direction that is offset from the axes Xa, Xb, Xc. In this regard, the first nozzle 22a may be configured to deliver the volume of fuel in a direction substantially along or parallel to the centerline 40a, the second nozzle 22b may be configured to deliver the volume of fuel in a direction substantially along or parallel to the centerline 40b, and the third nozzle 22c may be configured to deliver the volume of fuel in a direction substantially along or parallel to the centerline 40c.

As illustrated in FIG. 3B, in the assembled configuration the cylinders 14 may be positioned within the engine 10 such that the longitudinal axes A1 are substantially parallel to each other. In some configurations, the longitudinal axis A1a of the first cylinder 14a may also be offset from the longitudinal axis A1b of the second cylinder 14b that is adjacent to the first cylinder 14a. In this regard, the longitudinal axis A1b may be offset in a first direction from the longitudinal axis A1a by a distance Da. Similarly, the longitudinal axis A1c of the third cylinder 14c, that is adjacent to the second cylinder 14b, may be offset in a second direction from the longitudinal axis A1b by a distance Db. The second direction may be opposite the first direction. In some configurations, the distance Db may be substantially equal to the distance Da, such that the longitudinal axis Al c is aligned or otherwise coplanar with the longitudinal axis A1b. As discussed earlier, the engine 10 may include any number (N) of cylinders 14. In this regard, it will be appreciated that each cylinder 14(N) may be offset from an adjacent cylinder 14(N−1) by the distance Da, and offset from an adjacent cylinder 14(N+1) by the distance Db.

With reference to FIG. 3B, the first piston 16a and the nozzles 22a, 22b, 22c of the first cylinder 14a may be angularly offset about the longitudinal axis A1a relative to the first piston 16a and the the nozzles 22a, 22b, 22c, respectively, of the second cylinder 14b. Specifically, the first piston 16a and the first nozzle 22a of the second cylinder 14b may be angularly offset about the longitudinal axis A1b relative to the orientation of the first piston 16a and the first nozzle 22a of the first cylinder 14a about the longitudinal axis A1a. In this regard, the opening 53a of the first piston 16a and the axis Xa of the first nozzle 22a of the first cylinder 14a may be substantially aligned with the transverse axis A2a of the first cylinder 14a, while the opening 53a of the first piston 16a and the axis Xa of the first nozzle 22a of the second cylinder 14b may be offset from the transverse axis A2b of the second cylinder 14b by the angle θb. Similarly, the opening 53b of the first piston 16a and the axis Xb of the second nozzle 22b of the first cylinder 14a may be offset from the transverse axis A2a of the first cylinder 14a by the angle βa, while the opening 53b of the first piston 16a and the axis Xb of the second nozzle 22b of the second cylinder 14b may be substantially aligned with the transverse axis A2b of the second cylinder 14b. Similarly, still, the opening 53c of the first piston 16a and the axis Xc of the third nozzle 22c of the first cylinder 14a may be offset from the transverse axis A2a of the first cylinder 14a by the angle βc, while the opening 53c of the first piston 16a and the axis Xc of the third nozzle 22c of the second cylinder 14b may be offset from the transverse axis A2b of the second cylinder 14b by an angle θc. As previously discussed, the angles βa, βb, and βc may be substantially equal to each other. In addition, the angle θb may be between 45 and 75 degrees, and in some configurations, substantially equal to 60 degrees. Similarly, the angle θc may be between 45 and 75 degrees, and in some configurations, substantially equal to 60 degrees.

The configuration of the cylinders 14 and the pistons 16, including the distances Da and Db, the configuration of the nozzles 22a, 22b, 22c and the lobe centerlines 40a, 40b, 40c, including the angles β and θ, and the configuration of the pistons 16a, 16b, can allow for the closest possible arrangement of the cylinders 14 within the engine 10 having three nozzles 22. Specifically, arranging the cylinders 14, the pistons 16, and the nozzles 22a, 22b, 22c in the manner described can help to prevent the nozzles 22a, 22b, 22c from contacting or otherwise interfering with an adjacent cylinder 14 and/or the nozzles 22a, 22b, 22c of the adjacent cylinder 14, thus allowing for a reduction in the size of the engine 10. The inclusion of three nozzles 22, and the configuration of the recess 34 and the first, second and third lobes 36a, 36b, 36c within the engine 10, can help to ensure improved combustion performance, including efficient utilization and combustion of air within the combustion chamber, as well as the efficient mixing of fuel from each of the nozzles 22 within the combustion chamber.

Figure 4:
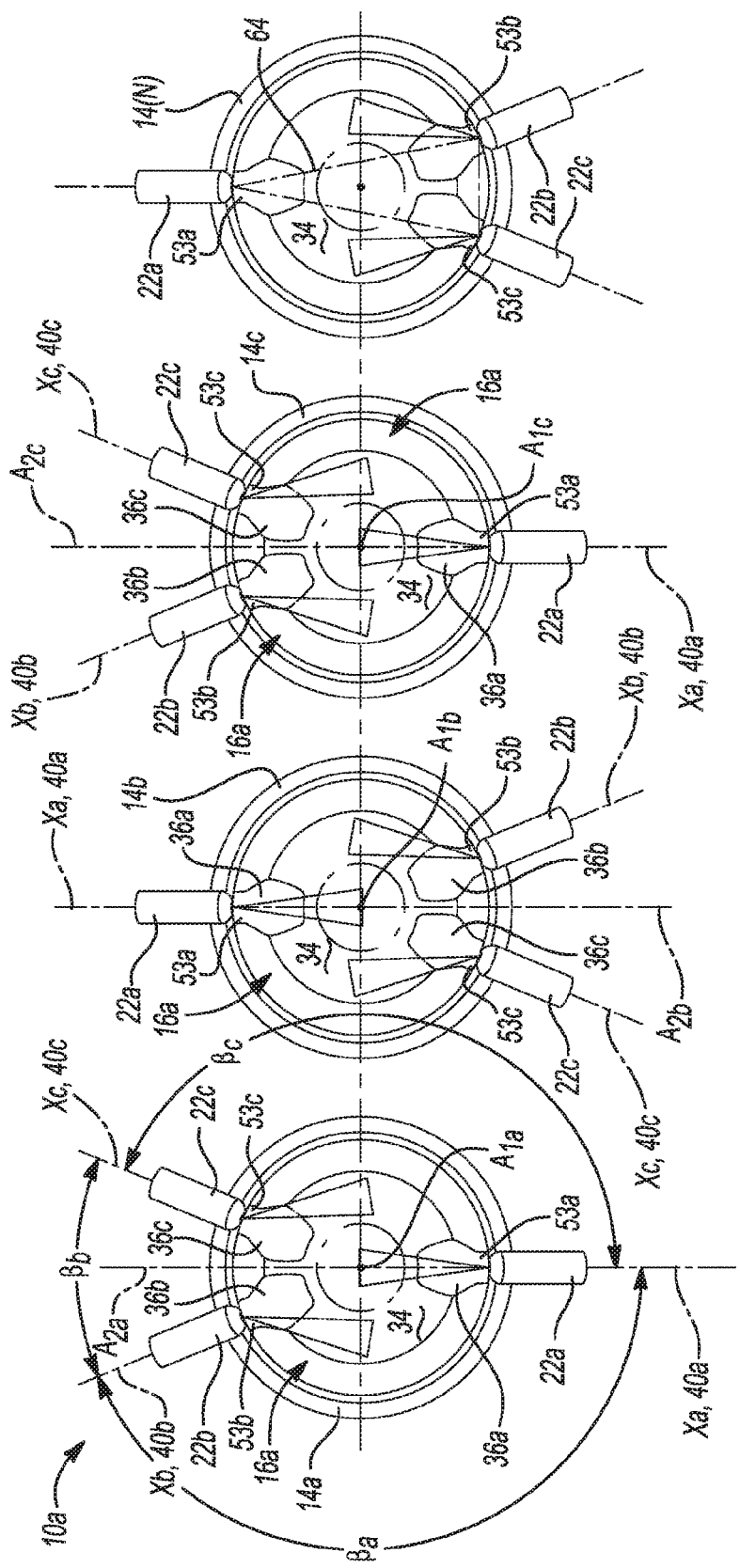
FIG. 4 is a cross-sectional view of another opposed-piston engine in accordance with the principles of the present disclosure.

With reference to FIG. 4, another example of an engine is labelled 10a. The engine 10a is substantially similar to the engine 10 such that only differences between the engines 10, 10a will now be described. In the engine 10 shown in FIG. 3B, the longitudinal axis A1b of the second cylinder 14b is offset in a first direction from the longitudinal axis A1a of the first cylinder 14a. In addition, the longitudinal axis A1c of the third cylinder 14c is offset in a second direction from the longitudinal axis A1b, where the second direction is opposite from the first direction. In contrast, in the engine 10a shown in FIG. 4, the longitudinal axes A1a, A1b, A1c, of the first, second, and third cylinders 14a, 14b, and 14c are aligned with one another such that the longitudinal axes A1a, A1b, A1c all lie within the same plane.

Further, in the engine 10 shown in FIG. 3B, the angles βa, βb, and βc between the axes Xa, Xb, Xc of the nozzles 22a, 22b, 22c are each equal to 120 degrees. Thus, the nozzles 22a, 22b, 22c are symmetrically disposed about the longitudinal axes A1a, A1b, A1c of the first, second, and third cylinders 14a, 14b, 14c. In contrast, in the engine 10a shown in FIG. 4, the angle βa between the first and second nozzles 22a and 22b is less than the angle βb between the second and third nozzles 22b and 22c and less than the angle βc between the first and third nozzles 22a and 22c. In addition, the angles βb and βc are equal to each other such that the distal ends of the nozzles 22a, 22b, 22c form an isosceles triangle 64. In one example, the angle βa is between 60 degrees and 120 degrees (e.g., 70 degrees), and each of the angles βb and βc are between 150 degrees and 120 degrees (e.g., 145 degrees). In the preceding example, each of the angles βb and βc may be determined by subtracting the angle βa from 360 degrees and dividing the result by two.

Figure 5:
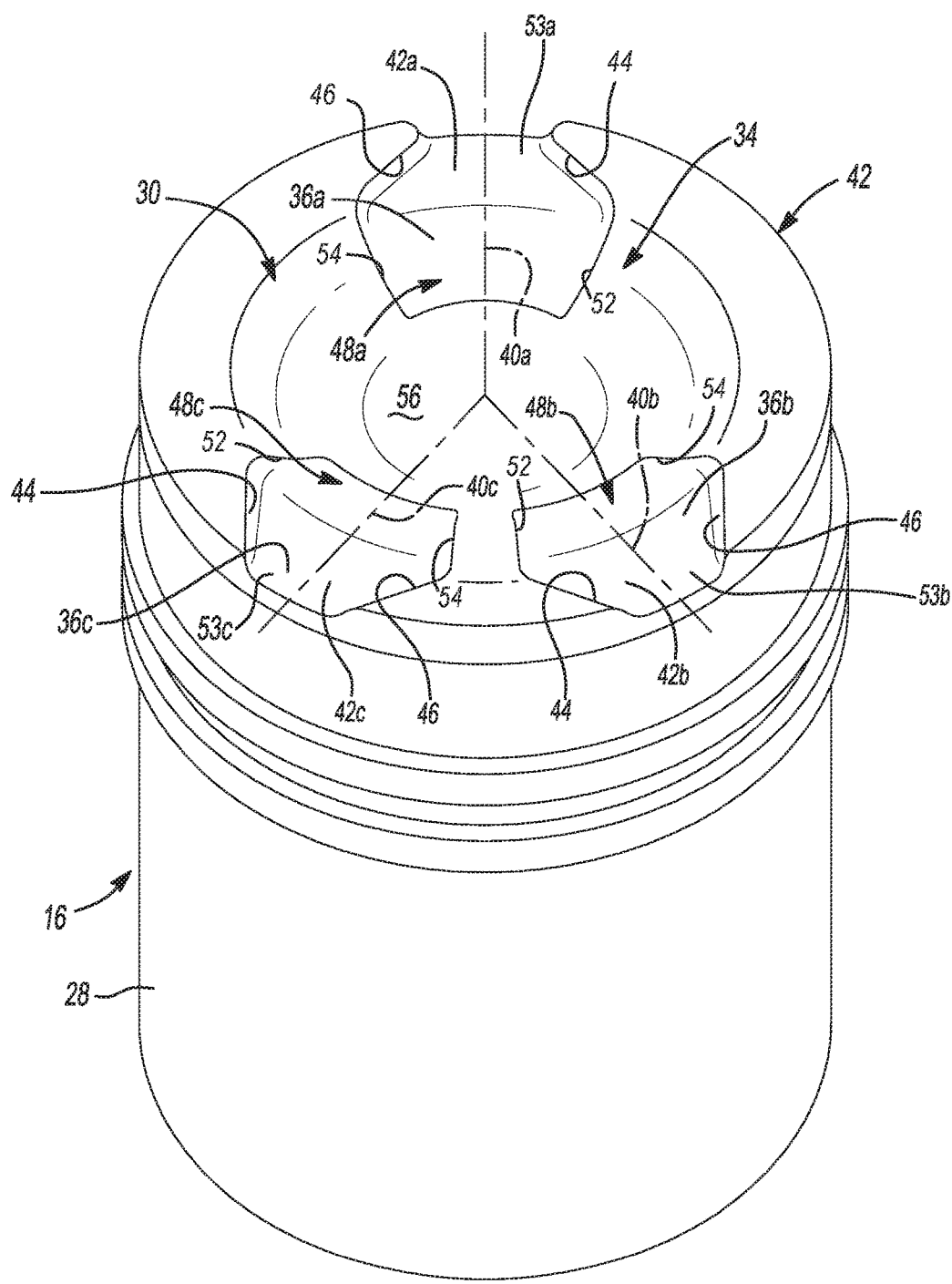
FIG. 5 is a side elevation view of an example piston of the opposed-piston engine of FIG. 4.

Further, with additional reference to FIG. 5, the shape of the crown 30 of the pistons 16 in the engine 10a is different than the shape of the crown 30 of the pistons 16 in the engine 10. In the engine 10a shown in FIGS. 3A and 3B, the lobe centerlines 40a, 40b, 40c are angularly offset relative to the nozzle axes Xa, Xb, Xc, respectively. In contrast, in the engine 10a shown in FIGS. 4 and 5, the lobe centerlines 40a, 40b, 40c are aligned or collinear with the axes Xa, Xb, Xc, respectively. Further, in the engine 10a shown in FIGS. 3A and 3B, the shapes of the lobes 36a, 36b, 36c are asymmetric with respect to the lobe centerlines 40a, 40b, 40c, respectively. In contrast, in the engine 10a shown in FIGS. 4 and 5, the shapes of the lobes 36a, 36b, 36c are symmetric with respect to the lobe centerlines 40a, 40b, 40c, respectively. Each lobe 36c, 36b, 36c includes a first flank surface 44, a second flank surface 46, a first side surface 52, and a second side 54.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A piston comprising:
   an outer peripheral surface having first and second openings spaced about and extending through the outer peripheral surface; and
   a crown having a first recess at least partially defined by a first lobe in fluid communication with the first opening, the first lobe having a first centerline, and a second lobe in fluid communication with the second opening, the second lobe having a second centerline, each of the first and second lobes being recessed relative to an adjacent portion of the first recess of the crown, wherein:
   the first recess has a substantially hemispherical shape and is symmetrically disposed about a longitudinal axis of the piston;
   the first lobe includes a first flank surface, a second flank surface, a first side surface, a second side surface, the first and second flank surfaces extending along the first centerline in a first direction from the first opening to the first and second side surfaces, respectively, and being angled away from the first centerline in the first direction, the first and second side surfaces being angled toward the first centerline in the first direction; and
   the second lobe includes a third flank surface, a fourth flank surface, a third side surface, and a fourth side surface, the third and fourth flank surfaces extending along the second centerline in a second direction from the second opening to the third and fourth side surfaces, respectively, and being angled away from the second centerline in the second direction, the third and fourth side surfaces being angled toward the second centerline in the second direction.

2. A piston comprising:
   an outer peripheral surface having first, second, and third openings spaced about and extending though the outer peripheral surface; and
   a crown having a first recess is at least partially defined by a first lobe in fluid communication with the first opening, a second lobe in fluid communication with the second opening, and third lobes in fluid communication with the third opening, each of the first, second, and third lobes being recessed relative to an adjacent portion of the first recess of the crown.

3. The piston of claim 2, wherein the first, second, and third openings are equally spaced about the outer peripheral surface.

4. The piston of claim 2 wherein the first opening is angularly offset relative to the second opening by a first angle, the second opening is angularly offset relative to the third opening by a second angle, and the third opening is angularly offset relative to the first opening by a third angle, and wherein the first and third angles are equal to one another and greater than the second angle.

5. The piston of claim 2, wherein the first recess is at least partially defined by a central mixing surface extending from and between the first, second, and third lobes.

6. The piston of claim 5, wherein the central mixing surface includes a central portion and first, second, and third branches extending radially outward from the central portion.

7. The piston of claim 5, wherein the first, second, and third lobes are recessed relative to the central mixing surface.

8. The piston of claim 2, wherein the first lobe includes a first centerline, the second lobe includes a second centerline, and the third lobe includes a third centerline, the first centerline intersecting the first opening and the second centerline, the second centerline intersecting the second opening and the third centerline, and the third centerline intersecting the third opening and the first centerline.

9. An opposed piston engine comprising the piston of claim 2, the opposed piston engine further comprising:
   a first housing defining a first passage extending along a first longitudinal axis, the piston slidably disposed within the first passage; and
   a second piston slidably disposed within the first passage, the second piston comprising a second outer peripheral surface and a second crown, the second outer peripheral surface having fourth and fifth openings spaced about and extending through the second outer peripheral surface, the second crown having a second recess at least partially defined by a fourth lobe in fluid communication with the fourth opening and a fifth lobe in fluid communication with the fifth opening.

10. The opposed piston engine of claim 9, wherein the first lobe is aligned with the fourth lobe to define a first volume, and the second lobe is aligned with the fifth lobe to define a second volume, the first volume being distinct from the second volume.

11. The opposed piston engine of claim 10, further comprising a first fuel injector in fluid communication with the first volume and a second fuel injector in fluid communication with the second volume.

12. The opposed piston engine of claim 9, wherein the first and second recesses at least partially define a combustion chamber.

13. The opposed piston engine of claim 9, further comprising:

a second housing defining a second passage extending along a second longitudinal axis substantially parallel to the first longitudinal axis; and a third piston slidably disposed within the second passage, the third piston comprising a third outer peripheral surface and a third crown, the third outer peripheral surface having and sixth and seventh openings spaced about the third outer peripheral surface, the third crown having a third recess at least partially defined by a sixth lobe in fluid communication with the sixth opening and a seventh lobe in fluid communication with the seventh opening.

14. The opposed piston engine of claim 13, wherein:

the first housing defines a first transverse axis extending substantially perpendicular to the first longitudinal axis;

the second housing defines a second transverse axis extending substantially perpendicular to the second longitudinal axis;

the first opening forms a first angle with the first transverse axis about the first longitudinal axis;

the sixth opening forms a second angle with the second transverse axis about the second longitudinal axis, the second angle being different than the first angle;

the second opening forms a third angle with the first transverse axis about the first longitudinal axis; and the seventh opening forms a fourth angle with the second transverse axis about the second longitudinal axis, the fourth angle being different than the third angle.

15. The opposed piston engine of claim 14, wherein a first difference between the first angle and the second angle is substantially equal to a second difference between the third angle and the fourth angle.

16. The opposed piston engine of claim 14, wherein a difference between the first angle and second angle is between 45 degrees and 75 degrees.

17. The opposed piston engine of claim 14, wherein a difference between the first angle and second angle is substantially equal to 60 degrees.

* * * * *

UNITED STATES PATENT AND TRADEMARK OFFICE
CERTIFICATE OF CORRECTION

PATENT NO. : 10,161,371 B2
APPLICATION NO. : 15/050945
DATED : December 25, 2018
INVENTOR(S) : Gustav R. Johnson et al.

Page 1 of 1

It is certified that error appears in the above-identified patent and that said Letters Patent is hereby corrected as shown below:

In the Claims

Column 12
Line 3, Claim 2          delete "though" and insert --through--

Column 12
Line 8, Claim 2          delete "third lobes" and insert --a third lobe--

Column 13
Line 7, Claim 13         after "having", delete "and"

Column 14
Line 14, Claim 16        after "and", insert --the--

Column 14
Line 17, Claim 17        after "and", insert --the--

Signed and Sealed this
Nineteenth Day of March, 2019

Andrei Iancu
*Director of the United States Patent and Trademark Office*